United States Patent [19]

Dirck

[11] 4,159,141

[45] Jun. 26, 1979

[54] SECURITY VEHICLE SUCH AS FOR TRANSPORTING PRISONERS HAVING DOUBLE DOORS

[76] Inventor: Ronald L. Dirck, P.O. Box 247, Warsaw, Ind. 46580

[21] Appl. No.: 854,113

[22] Filed: Nov. 23, 1977

[51] Int. Cl.² .............................................. B60B 3/00
[52] U.S. Cl. .................................... 296/24 R; 296/50; 49/54
[58] Field of Search ................... 49/50, 51, 52, 53, 54, 49/55, 56, 57, 61, 63, 366; 296/24 R, 24 C, 39 R, 19, 50, 51

[56] References Cited

U.S. PATENT DOCUMENTS

| | | | |
|---|---|---|---|
| 2,314,419 | 3/1943 | Olson | 296/19 |
| 2,539,345 | 1/1951 | Creech | 49/54 |
| 3,574,388 | 4/1971 | Stone | 296/24 C |

*Primary Examiner*—Philip Goodman
*Attorney, Agent, or Firm*—Oltsch, Knoblock & Hall

[57] ABSTRACT

A security vehicle, such as for transporting prisoners, having a passenger compartment with a door opening therein. The door opening is secured by first and second pairs of doors which can be locked independently of one another.

7 Claims, 5 Drawing Figures

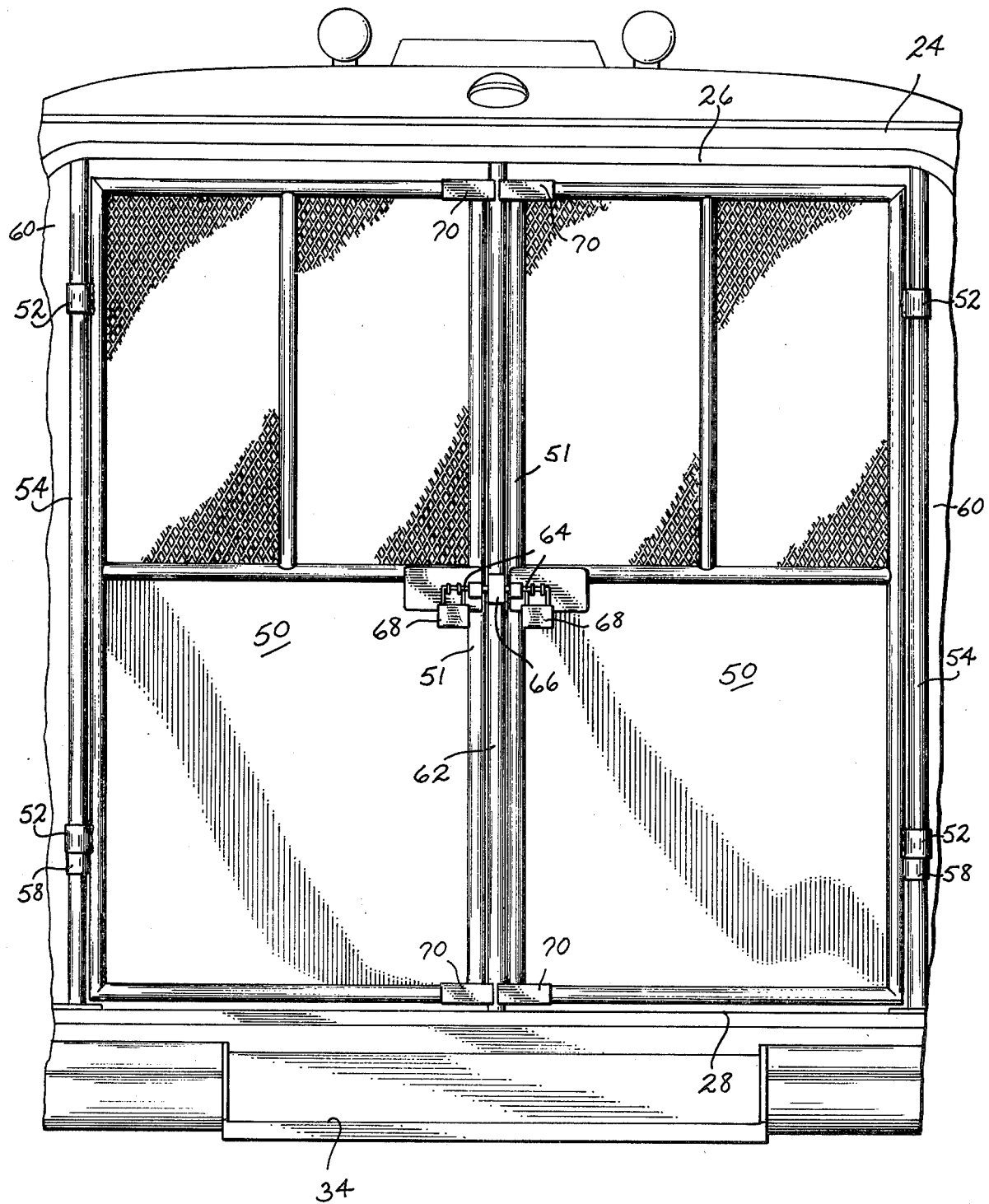

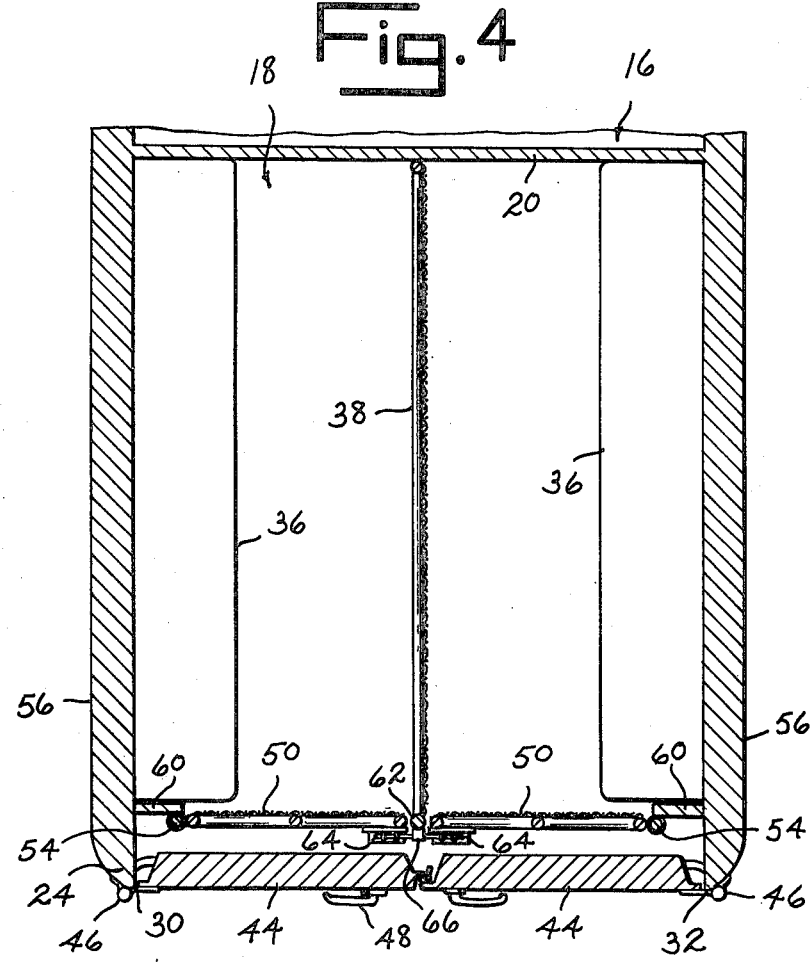
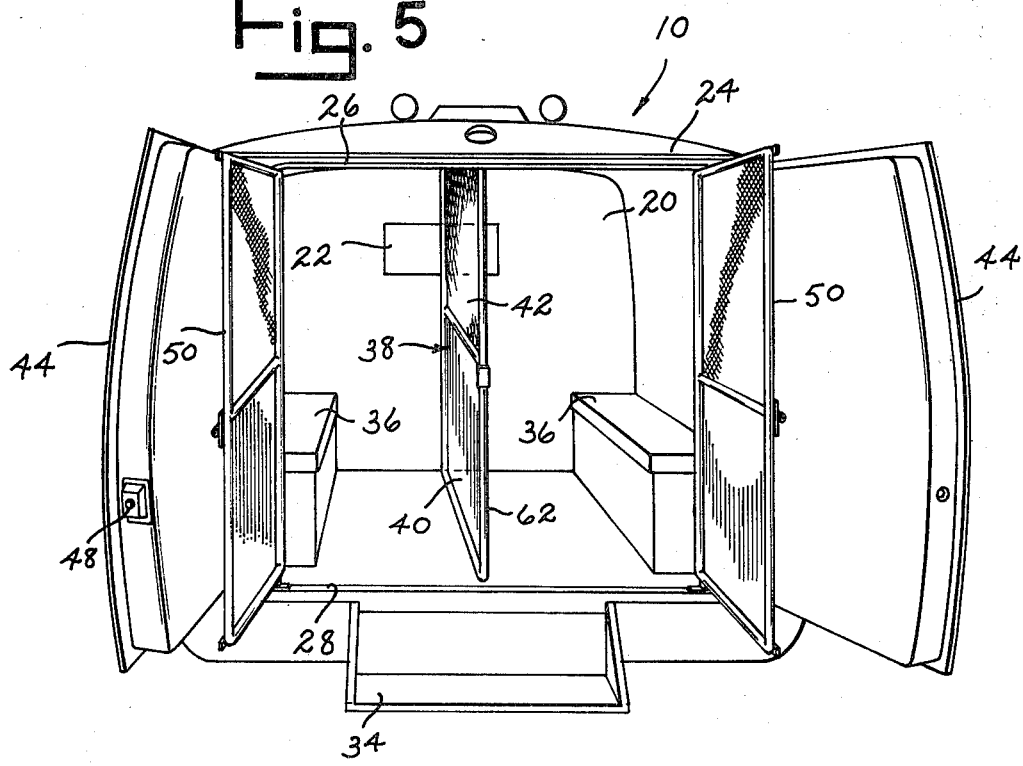

SECURITY VEHICLE SUCH AS FOR TRANSPORTING PRISONERS HAVING DOUBLE DOORS

SUMMARY OF THE INVENTION

This invention relates to a vehicle having a secured passenger compartment for transporting prisoners, mental patients and similar personnel.

The vehicle of this invention includes a frame supported passenger compartment having a door opening therein. The compartment door opening is secured by two pairs of independently operable doors. The innermost of the pair of doors preferably includes panel sections of screen which permit the interior of the passenger compartment to be viewed when the outermost pair of the doors are opened with the innermost doors remaining in their secured or locked position.

Accordingly, it is an object of this invention to provide a vehicle having a passenger compartment for transporting prisoners, mental patients or similar personnel.

Another object of this invention is to provide a vehicle for transporting prisoners, mental patients and similar personnel and which includes a passenger compartment for such personnel secured by two pairs of independently operable and lockable doors.

Still another object of this invention is to provide a security vehicle having a passenger compartment secured first by a pair of inner doors having see-through parts to permit viewing into said passenger compartment, and secondly by a pair of outer doors which overlie the inner doors and which are independently operable thereof.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is an enlarged fragmentary rear view of the vehicle as seen in FIG. 2 detailing the closed and secured inner pair of rear doors.

FIG. 4 is a fragmentary sectional view of the passenger compartment of the vehicle as seen along line 4—4 of FIG. 1.

FIG. 5 is a rear view of the vehicle shown with both the inner and outer pairs of doors in their open position to expose the passenger compartment within the vehicle.

DESCRIPTION OF THE PREFERRED EMBODIMENT

Figure 1:
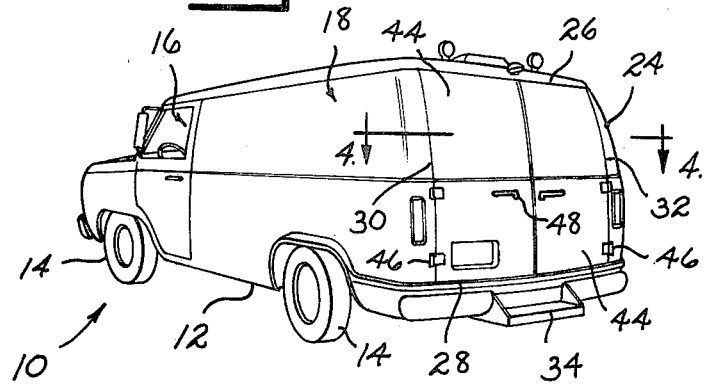
FIG. 1 is a perspective view of a vehicle having the invention hereof incorporated therein.
Figure 2:
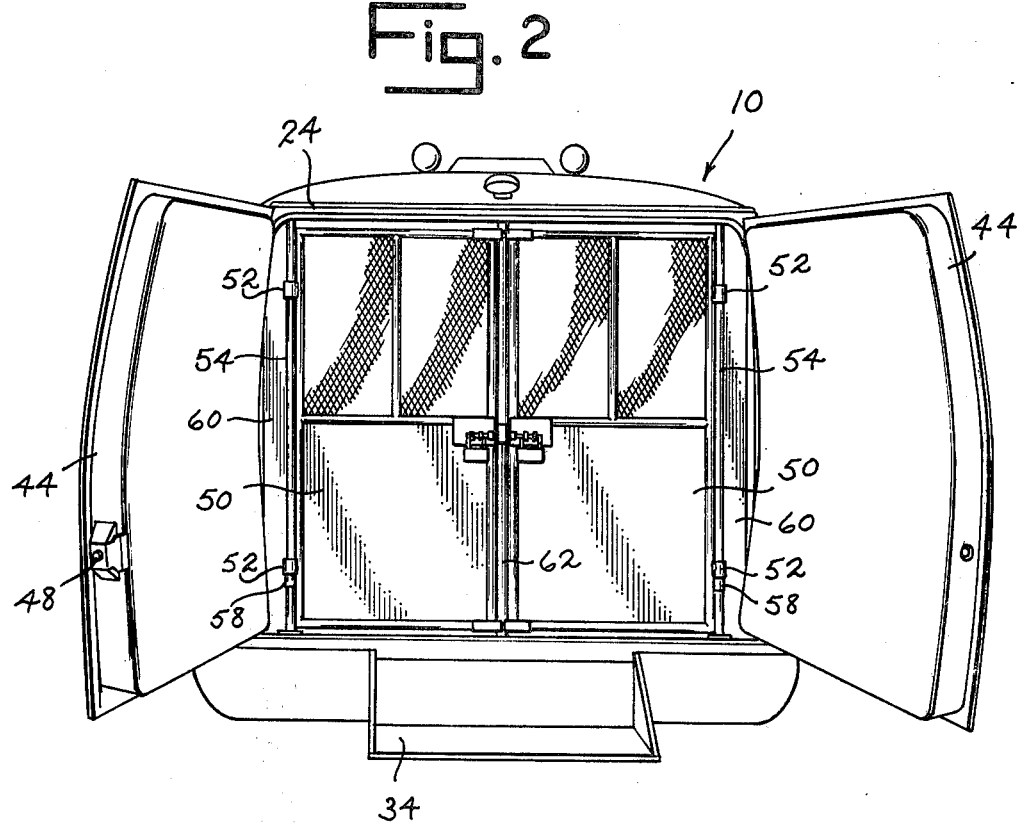
FIG. 2 is a rear view of the vehicle of FIG. 1 showing the outer rear doors thereof in their open position.

The preferred embodiment illustrated is not intended to be exhaustive or to limit the invention to the precise form disclosed. It has been chosen and described in order to best explain the principles of the invention and its application and practical use to thereby enable others skilled in the art to best utilize the invention.

Vehicle 10 illustrated in the figures includes an undercarriage or frame 12 supported by wheels 14 (only two of the four wheels shown). A driver's compartment 16 and a passenger compartment 18 are carried by frame 12. Compartments 16 and 18 are separated by an internal wall 20. Wall 20 is preferably provided with a window 22 through which individuals in the driver's compartment 16 may see into passenger compartment 18. As thus far described, vehicle 10 is of an ordinary commercial construction and includes a suitable motor by which the vehicle can be propelled from within driver's compartment 16.

Passenger compartment 18 includes a rear wall 24 which is interrupted by an ingress and exit opening into the passenger compartment. The rear opening into the passenger compartment 18 is defined by an upper edge 26 and side edges 30 and 32 of rear wall 24 and compartment floor 28.

Vehicle 10 includes a platform 34 which is mounted at the rear of the vehicle adjacently below the level of passenger compartment floor 28. Platform 34 serves as a step by which personnel may enter the passenger compartment through the opening in its rear wall 24. A bench or elongated seat 36 is provided on each side of the passenger compartment. An interior partition 38 extends longitudinally within passenger compartment 18 from wall 20 to the opening in rear wall 24, preferably along the longitudinal centerline of the passenger compartment, between seats 36 so as to divide the compartment into two sections. Partition 38 is preferably formed of a solid lower panel part 40 and a screened upper panel part 42 which permits visual communication between the separated sections of the passenger compartment.

A pair of outer doors 44 are connected by hinges 46 at side edges 30 and 32 of the opening in rear wall 24 of the vehicle 10. Doors 44, as illustrated in FIG. 1, span the opening in rear wall 24 when in their closed position and are preferably of a solid panel construction having an externally accessible lock mechanism 48. A pair of inner doors 50 are located between outer doors 44 and the interior of passenger compartment 18, preferably just rearwardly of the rear end edges of seats 36 within the compartment. Each inner door 50 is connected by hinges 52 to a stanchion 54 which is located adjacent the side edge 30, 32 of the opening in vehicle rear wall 24. Each stanchion 54 is connected at its lower end to floor 28 of the passenger compartment and at its upper end to the roof panel of the compartment. Also each stanchion 54 includes an attached collar 58 which contacts and supports a hinge 52 of its connected inner door 50 so as to spacedly support the door above compartment floor 28 during its pivotal movement. A narrow wall panel 60 extends between each stanchion 54 and the adjacent side wall 56 of passenger compartment 18.

Partition 38, which extends longitudinally through passenger compartment 18, includes a frame part 62 which extends from the roof panel of the vehicle 10 to the floor 28 of passenger compartment 18 just slightly inset from the opening in vehicle rear wall 24. Frame part 62 lies within the plane of inner doors 50 when the doors are in their closed position, as best illustrated in FIG. 4. A lock slide bolt 64 is carried by each inner door 50 at its outer face at the outside edge 51 of the door. A lock block 66 is connected, such as by welding, to frame part 62, and includes openings for the receipt of lock bolts 64 of inner doors 50 to secure the doors in their closed opening spanning position shown in FIG. 3. Associated with each lock bolt 64 is a padlock 68 by which the lock bolts can be secured within lock block 66 to individually secure each inner door in its closed position. Each inner door 50 includes a pair of stop plates 70 located at its upper and lower edges. Stop plates 70 protrude from the outside edge 51 of the door and engage frame part 62 to position the door when closed with its lock bolt 64 aligned with a receiving opening within lock block 66 of frame part 62. This enables each inner door 50 to be simply and quickly closed and secured.

Each inner door 50 is preferably formed with a lower solid panel part and an upper screen mesh part so as to permit viewing into passenger compartment 18 when outer doors 44 are opened with the inner doors remaining in their locked, closed position. For security purposes, it is preferable to form the interior walls and floor of passenger compartment 18 of sheet metal, such as steel, with partition 38 and inner doors 50 also being formed of steel sheeting and steel wire mesh. Outer doors 44 when closed are located adjacently rearwardly of inner doors 50 as shown in FIG. 4. By utilizing two sets of doors, outer doors 44 can be first opened to allow complete visual observation of the occupants of passenger compartment 18 before inner doors 50 are unlocked. Additionally, each of the inner doors 50 are individually locked so as to permit one section of the passenger compartment to be opened at a time if desired. Also, should the occupants of the passenger compartment force the inner doors 50 open, escape of the occupants from passenger compartment 18 will be prevented due to the locked outer doors 44.

It is to be understood that the invention is not to be limited to the details above given, but may be modified within the scope of the following appended claims.

What I claim is:

1. In a security vehicle including a frame, wheels supporting said frame, a passenger compartment supported by said frame, said passenger compartment including seats and having a rear wall and a front wall, an ingress and exit opening into said passenger compartment in said rear wall, said opening defined by a top edge, a bottom edge, a first side edge and a second side edge, the improvement comprising a pair of outer doors, one of said outer doors hinged to said rear wall at said opening first side edge, the other of said outer doors hinged to said rear wall at said opening second side edge, said outer doors having a closed position spanning said rear wall opening, means for securing said outer doors in their closed position, a pair of inner doors located between said outer doors and said front wall, one of said inner doors hinged to said passenger compartment adjacent the hinge connection of said one outer door, the other of said inner doors hinged to said passenger compartment adjacent the hinge connection of said other outer door, said inner doors having a closed position across said rear wall opening, and means for securing said inner doors in their closed position, said passenger compartment including a vertical frame part located within the plane of said inner doors when in their closed position, each inner door extending to said vertical frame part and being secured thereto by said inner door securing means.

2. The security vehicle of claim 1 wherein said inner door securing means includes a release part located exteriorly of said passenger compartment.

3. The security vehicle of claim 1 and a divider extending longitudinally within said passenger compartment to divide said compartment into multiple sections, said inner door securing means including individual lock means for separately securing said inner doors to said vertical frame part when in their closed position to enable individual access from said rear wall opening into said multiple sections.

4. The security vehicle of claim 3 wherein said divider is aligned with said vertical frame part.

5. The security vehicle of claim 3 wherein each inner door includes means for permitting visibility into said passenger compartment when said outer doors are opened and said inner doors are in their closed position.

6. The security vehicle of claim 5 wherein each inner door includes a frame, said inner door means permitting visibility constituting a screen carried by said inner door frame.

7. The security vehicle of claim 2 wherein said outer door securing means includes a release part located exteriorly of said outer doors.

* * * * *